Figure 1:
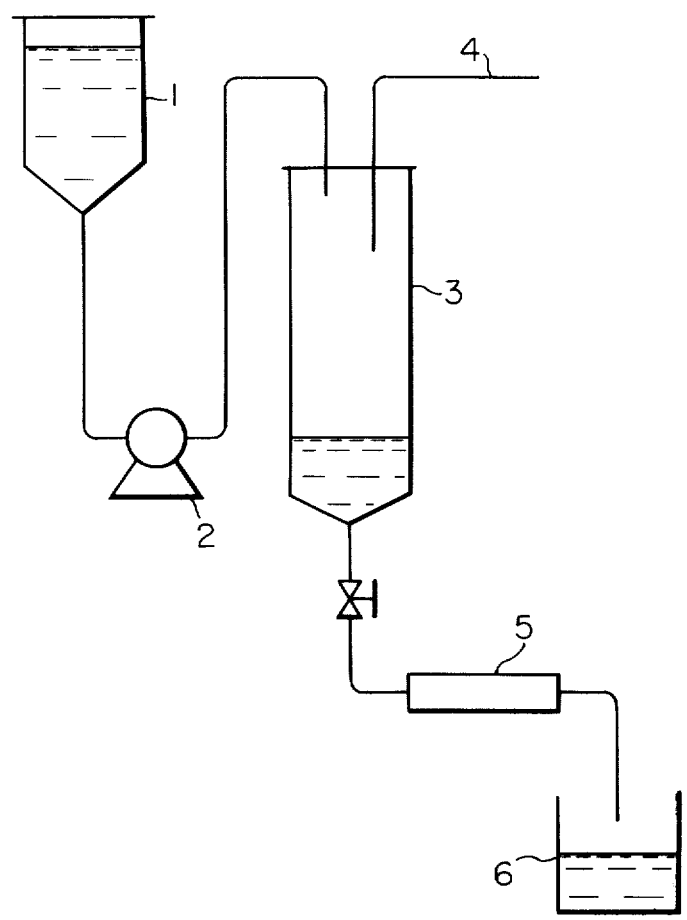

United States Patent [19]

Ishizawa et al.

[11] 3,883,309
[45] May 13, 1975

[54] APPARATUS FOR THE GENERATION OF GASEOUS FORMALDEHYDE FROM FORMALDEHYDE POLYMER

[75] Inventors: Kazutomo Ishizawa; Yasunori Nagata; Hisakazu Ikui, all of Osaka, Japan

[73] Assignee: Kanebo Ltd., Tokyo, Japan

[22] Filed: Aug. 8, 1972

[21] Appl. No.: 278,874

[52] U.S. Cl. .................... 23/260; 23/285; 260/606
[51] Int. Cl. ........ B01d 1/00; B01j 7/00; C07c 47/04
[58] Field of Search...... 23/252 R, 260, 285, 288 G; 260/606

[56] References Cited
UNITED STATES PATENTS

| | | | |
|---|---|---|---|
| 1,378,595 | 5/1921 | MacMahon | 23/285 X |
| 1,762,471 | 6/1930 | Day | 23/285 X |
| 2,149,299 | 3/1939 | Lassiat | 23/288 R |
| 2,460,592 | 2/1949 | Miller, Jr. | 260/606 |
| 2,710,246 | 6/1955 | Marks et al. | 23/252 R X |
| 2,965,443 | 12/1965 | Osborne et al. | 23/260 X |
| 3,362,794 | 1/1968 | Bergman | 23/260 X |
| 3,652,229 | 3/1972 | Burke | 23/285 X |

FOREIGN PATENTS OR APPLICATIONS
144,527    1/1951    Netherlands.......................... 23/285

*Primary Examiner*—Morris O. Wolk
*Assistant Examiner*—Michael S. Marcus
*Attorney, Agent, or Firm*—Woodhams, Blanchard and Flynn

[57] ABSTRACT

A process and an apparatus for generating gaseous formaldehyde from a dispersion of formaldehyde polymer in a liquid carrier are provided. The dispersion is continuously fed from a mixing tank to an evaporator in a manner such that said dispersion flows into the evaporator in the state of overflow, where the dispersion is heated to evaporate gaseous formaldehyde. The liquid carrier collected on the bottom is continuously discharged while the free surface of the liquid carrier is maintained at a stated range of height by a liquid level controlling means. The liquid carrier discharged therefrom is cooled, and then made to circulate to the mixing tank where the formaldehyde polymer is replenished thereto and the resulting dispersion is fed to the evaporator repeatedly.

11 Claims, 7 Drawing Figures

APPARATUS FOR THE GENERATION OF GASEOUS FORMALDEHYDE FROM FORMALDEHYDE POLYMER

The present invention relates to a process and an apparatus for generating formaldehyde gases or vapors from a formaldehyde polymer in a continuous or continual manner.

As is well known in the art, formaldehyde has various uses particularly in the fields of the treatment of fibrous articles and the synthesis of chemical compounds because of its high reactivity. In order to yield better results in the treatment of fibrous articles, it would be obviously desirable to employ formaldehyde in the form of a gas or vapor at a high concentration. However, the treatment wherein gaseous formaldehyde is employed involves the following difficulties: Although it is possible to directly feed a solid formaldehyde polymer into a gas generator or evaporator, and change the solid form into a gaseous form therein, it is difficult to feed the solid at a constant rate into the gas evaporator. Further, gaseous formaldehyde generated therein tends again to polymerize into a solid form, and some of the solid formaldehyde polymer is charred while the formaldehyde polymer is heated on the heat transfer surfaces. This inevitably causes reduction of the efficiency of heat transfer and therefore decrease of the capacity of gas generation.

In order to obviate the difficulties set forth above, several processes have been already proposed wherein a formaldehyde polymer is dispersed in a liquid carrier, which is inert to and incapable of dissolving formaldehyde and does not vaporize at the temperature at which gaseous formaldehyde is generated. The dispersion is then fed to an evaporator where it is heated to the temperature of gas generation. One example of these processes is illustrated in Miller's U.S Pat. No. 2,460,592, a flow sheet of which is shown as FIG. 1 in the attached drawings. In reference to FIG. 1, a dispersion of formaldehyde polymer in the liquid carrier is fed from a feed tank 1 into an evaporator 3 by means of a metering pump 2. The dispersion is heated to generate gaseous formaldehyde. The gas released from the dispersion is led to process through a discharge conduit 4. The remaining unchanged liquid is passed through a heat exchanger 5 to a reservoir 6.

This process provides, however, the following problems:

An atmosphere within the evaporator 3 is maintained at such high temperatures, usually 100° to 150°C, that the gaseous formaldehyde generated therein does not polymerize. In contrast, both the conduits for introducing the formaldehyde polymer dispersion into the evaporator 3 and for discharging the liquid therefrom are cooled below the temperature of gas generation. Therefore, when gaseous formaldehyde generated within the evaporator 3 penetrates into the introduction or discharge conduit by some chance, the gas is inevitably cooled to polymerize and solidifies therein. This causes clogging of the conduit and prevents the transfer of the dispersion. This is the first problem.

Secondly, in the case where the atmosphere within the evaporator 3 is under reduced pressure, it is impossible to draw off the liquid carrier collected on the bottom of the evaporator 3, because air flows back through the discharge conduit and penetrates into the evaporator. Therefore, in order to ensure the continuous generation of gaseous formaldehyde over a long period of time, it is necessary to extraordinarily enlarge the capacity of the evaporator for receiving the liquid carrier. This leads to increase in the cost of equipment and the reduction of the efficiency of gas generation.

Therefore, it is an object of the present invention to obviate these defects, i.e. to provide a process for generating gaseous formaldehyde from formaldehyde polymer in a continuous or continual manner employing a circulation system wherein the gaseous formaldehyde generated in an evaporator does not penetrate at all into the introduction conduit of the polymer dispersion and the discharge conduit of the liquid carrier and, therefore, the gas generation can be continued over a far longer period of time.

It is another object of the present invention to provide an apparatus for practicing such a process of generation.

Other objects and advantages will be apparent from the following description.

According to the present invention, there is provided a process of generating gaseous formaldehyde from a formaldehyde polymer, wherein a dispersion of the formaldehyde polymer in a liquid carrier, which is inert to formaldehyde, is admitted to an evaporator. This process is characterized in that:

a. said dispersion of the formaldehyde polymer in said liquid carrier is continuously fed from a mixing tank to the evaporator in a manner such that said dispersion flows into the upper part of the evaporator in the state of overflow; (b) the liquid carrier collected on the bottom of the evaporator is continuously discharged from the evaporator while the free surface of the liquid carrier is maintained at a stated range of height, so that the outlet of the liquid carrier is submerged below the free surface at all times, and; (c) the liquid carrier is made to circulate to the mixing tank where the formaldehyde polymer is replenished thereto, and the resulting dispersion is made to flow to the evaporator repeatedly.

There is further provided an apparatus for generating gaseous formaldehyde from a formaldehyde polymer comprising: (a) one or more mixing tanks for preparing a dispersion of the formaldehyde polymer in a liquid carrier; (b) a feed tank for receiving the dispersion from the mixing tank and feeding the dispersion to the evaporator set forth below; (c) an evaporator for heating the dispersion at the temperature of gas generation, and; (d) a cooler for cooling the liquid carrier discharged from the evaporator. This apparatus is characterized in that: said four members, (a), (b), (c) and (d) above, are connected in series in that order; said mixing tank (a) being connected to a means of feeding the formaldehyde polymer as finely divided particles to said mixing tank (a); said evaporator (b) being provided at the upper part thereof with an inlet feed means comprising an overflow means for making the dispersion flow into the evaporator in the state of overflow, and at the lower part thereof with a liquid level controlling means. This liquid level controlling means has upper and lower detecting probes and located at a lower part of the evaporator to maintain the free surface of the liquid carrier collected on the bottom of the evaporator at a height between the two detecting probes. The liquid level controlling means transmits a signal to a liquid discharge means, which then discharges the liquid carrier from the bottom of the evaporator in response to the signal.

The present invention will be illustrated with reference to the accompanying drawings.

Figure 2:
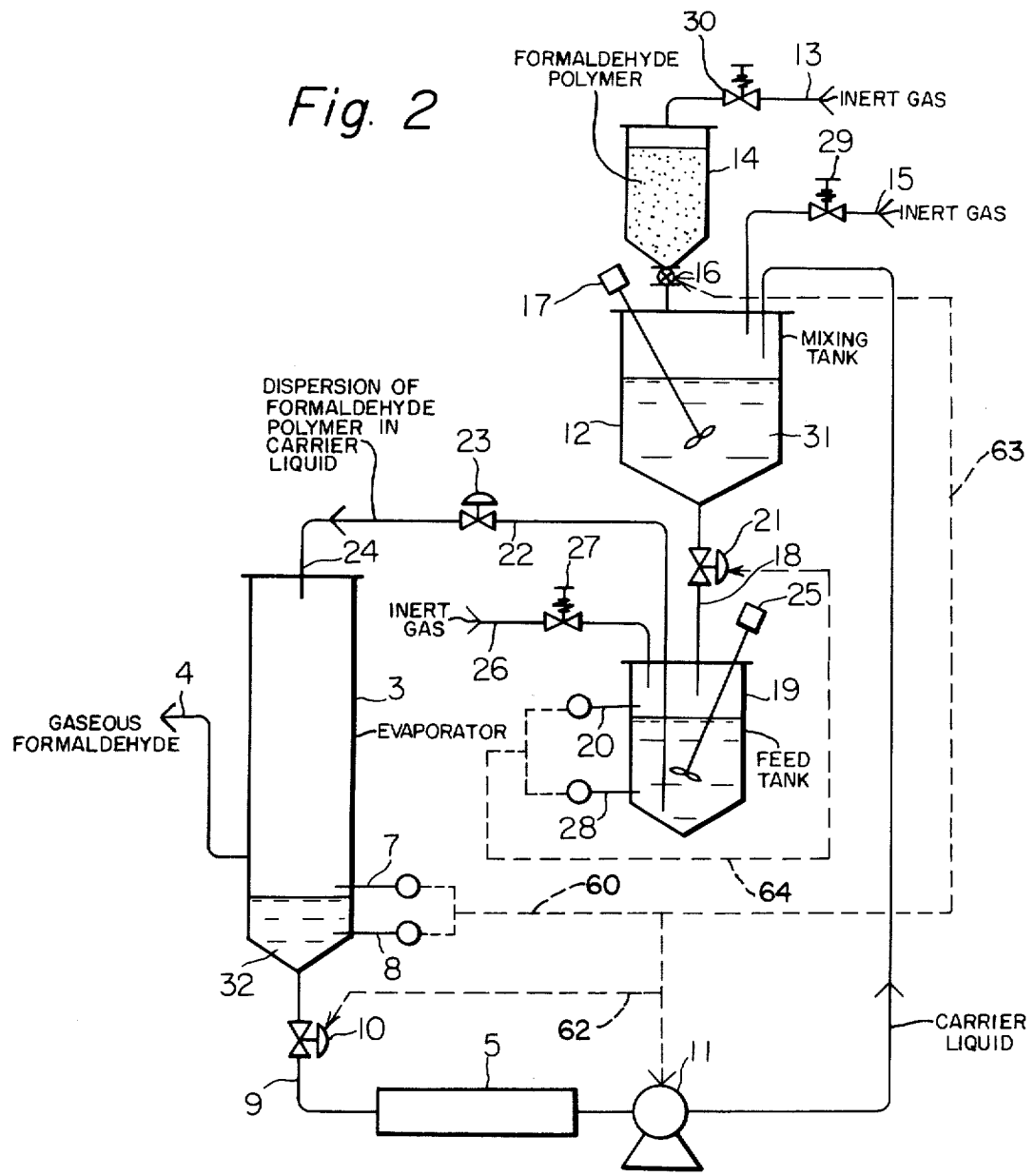
Figure 3A:
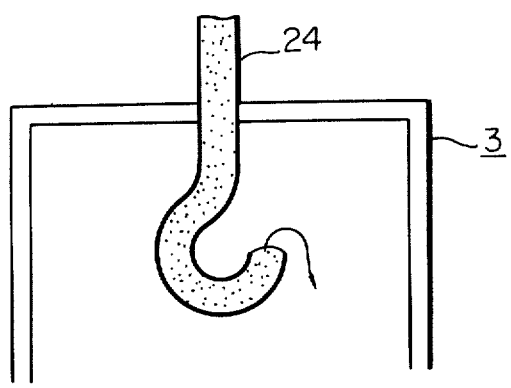
Figure 3B:
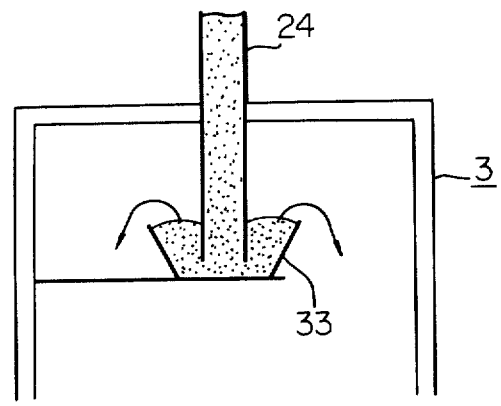
Figure 4:
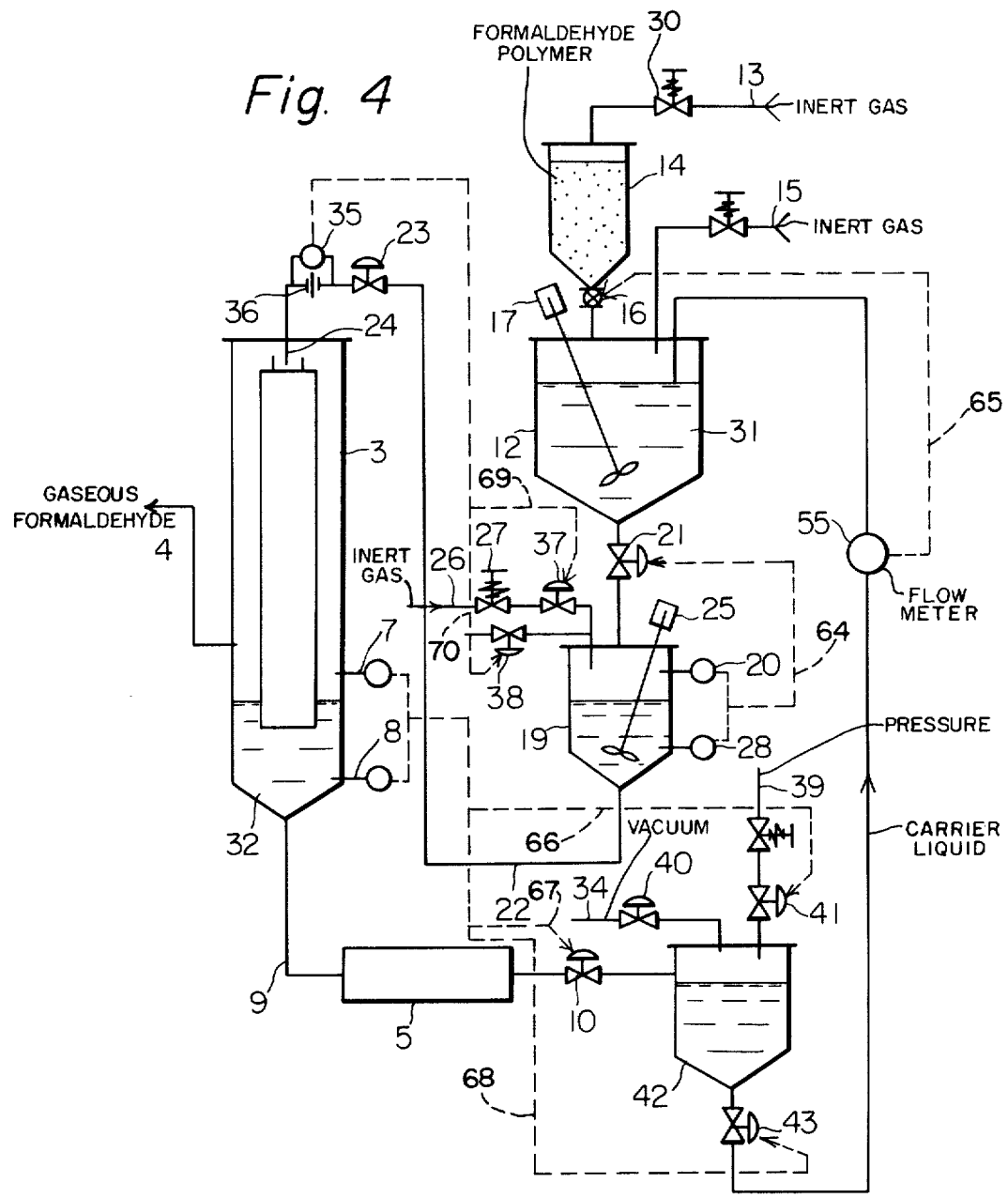
Figure 5:
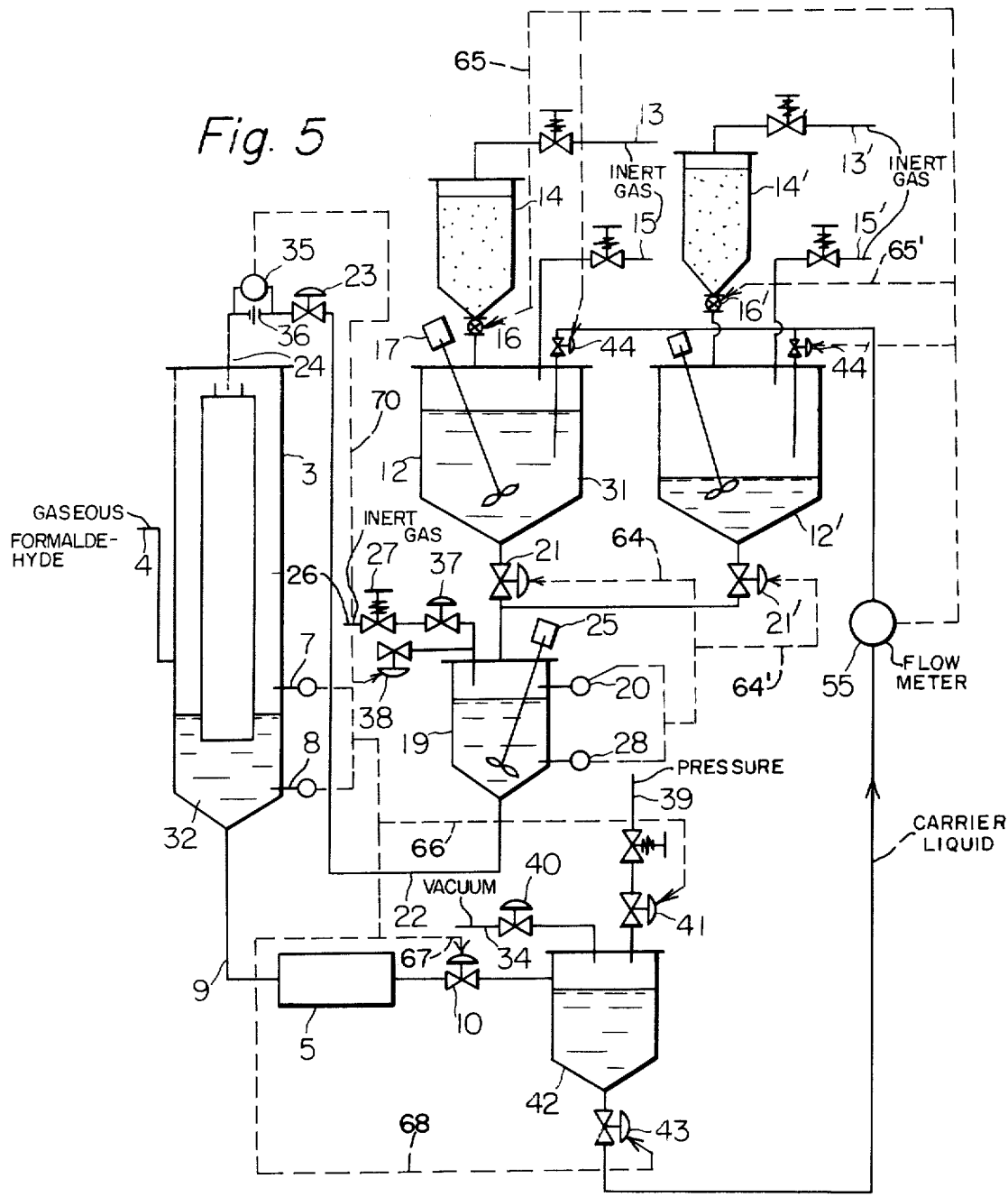
Figure 6:
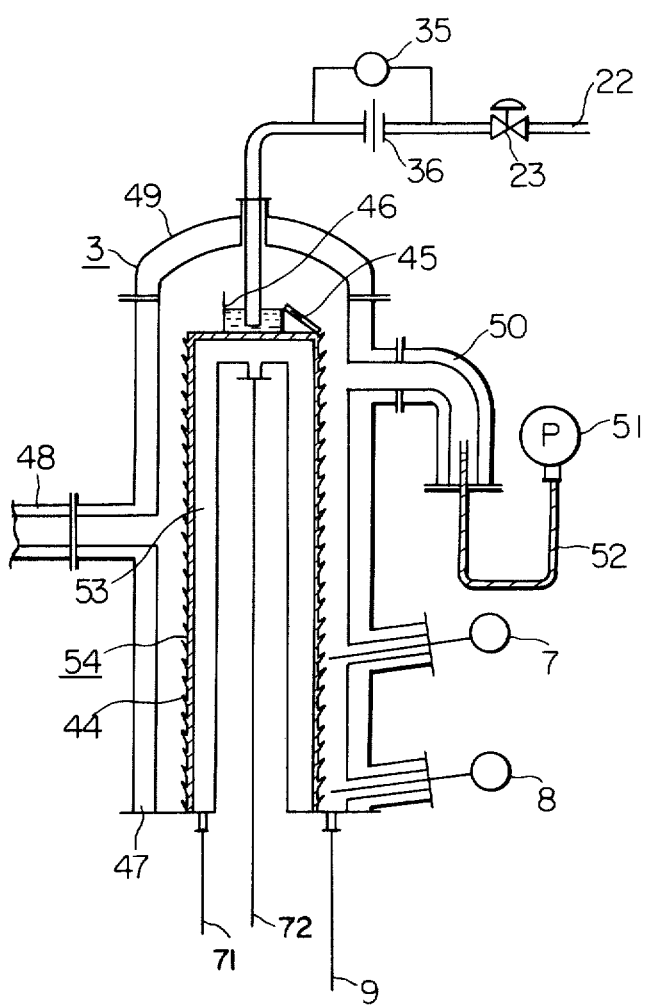

FIG. 1 is a flow sheet illustrating the known system of gas generation as referred to hereinbefore, FIG. 2 is a flow sheet illustrating a preferred embodiment of the process of the present invention, FIGS. 3A and 3B are enlarged cross-sectional views showing nozzle portions of the introduction conduit of polymer dispersion, FIG. 4 is a flow sheet illustrating another preferred embodiment of the process of the present invention, FIG. 5 is a flow sheet illustrating still another preferred embodiment of the process of the present invention, FIG. 6 is an enlarged cross-sectional view showing of the evaporator.

In FIGS. 2, 4 and 5, each solid line signifies the route along which material is transferred and each dashed line signifies the route along which a signal is transmitted.

With reference to FIG. 2, an evaporator 3 is maintained at temperatures of 100° to 300°C, preferably 200° to 300°C, by a suitable known heating means, such as heat transfer medium or electrical heater. A dispersion of a formaldehyde polymer such as paraformaldehyde is introduced through a nozzle 24 to the evaporator 3 where the dispersion is heated to evaporate gaseous formaldehyde. The liquid carrier used herein is that which is inert to and incapable of dissolving formaldehyde, and has a neglegibly small vapor pressure at the temperature of gas generation, e.g. not exceeding 1 mmHg. Preferable liquid carriers include polyethylene glycol, having a molecular weight of 200 to 600, and polychlorobiphenyl. The evaporator 3 is provided with a liquid level control means having upper and lower detecting probes 7 and 8. The two detecting probes 7 and 8 are located at a height between an outlet of gaseous formaldehyde to a conduit 4 and an outlet of the liquid carrier to a discharge conduit 9. The two detecting probes 7 and 8 detect the highest and lowest levels of the liquid carrier collected on the bottom of the evaporator 3. An automatic control valve 10 is provided on the conduit 9, preferably close to the outlet of the liquid carrier. This control valve 10 opens and shuts automatically in response to a signal transmitted from the upper and lower detecting probes 7 and 8 through lines 60, 61 and 62, to maintain the liquid level at a height between the two detecting probes.

The liquid discharge conduit 9 is provided with a heat exchanger 5 for cooling the liquid carrier, and a liquid feed pump 11. The conduit 9 terminates at a mixing tank 12.

An inert gas such as nitrogen is blown into a formaldehyde polymer feed tank 14 through a conduit 13. A formaldehyde polymer, usually as finely divided particles, is fed to the mixing tank 12 by means of metering pump 16, which operates synchronously with the metering pump 11 due to signals transmitted from the detecting probes 7 and 8 through lines 60 and 63. In the mixing tank 12, the polymer is thoroughly mixed, at a predetermined proportion, with the liquid carrier by a stirring means 17. The resultant polymer dispersion is fed through a conduit 18 to a feed tank 19. An automatic control valve 21 on the conduit 18 automatically controls the feed rate of the polymer dispersion 31 from the mixing tank 12 to the feed tank 19. That is, the automatic control valve 21 maintains the liquid level in the feed tank 19 at a stated range of height, i.e. between upper and lower detecting probes 20 and 28. When the liquid level descends to the height of the lower detecting probe 28 with the discharge of the polymer dispersion, the automatic control valve 21 opens in response to the signal transmitted from the lower detecting probe 28 through line 64. The polymer dispersion 31 is then fed from the mixing tank 12 to the feed tank 19. The feed of the polymer dispersion 31 is carried out by the differential pressure between the mixing tank 12 and the feed tank 19. This is because the inner pressure of the feed tank 19 is maintained lower than that of the mixing tank 12 and higher than that of the solid polymer feed tank 14 by suitably determining the pressure of inert gas introduced through conduits 13, 15 and 26, and valves 30, 29 and 27 into the three tanks 14, 12 and 19, respectively. In contrast, when the liquid level in the feed tank 19 rises to the height of the upper detecting probe 20, the automatic control valve 21 shuts due to a signal transmitted from the probe 20 through line 64 and stops the feed of polymer dispersion from the mixing tank 12 to the feed tank 19.

Similarly, the polymer dispersion is fed from the feed tank 19 through a conduit 22 and an automatic control valve 23 to the evaporator 3.

The feed rate of the polymer dispersion is voluntarily determined by controlling the difference between inner pressures of the feed tank 19 and the evaporator 3.

When the polymer dispersion is introduced into the evaporator 3 at a constant rate, gaseous formaldehyde is continuously generated at a constant rate therein. The gaseous formaldehyde is withdrawn through the conduit 4 to a reactor or treating vessel (not shown). The liquid carrier and a small amount of unvaporized formaldehyde polymer collect on the bottom of the evaporator 3. When the liquid level reaches the upper detecting probe 7, the automatic control valve 10 opens and the metering pump 11 operates, both in response to the signal transmitted from the liquid level control means. This causes the liquid carrier 32 to circulate to the mixing tank 12. The liquid carrier 32 is cooled, preferably to a temperature below 80°C, by flowing through a heat exchanger 5. This is in order to prevent gas generation from the formaldehyde polymer remaining in the liquid carrier while it is flowing through the conduit 9. When a fair amount of liquid carrier is discharged from the evaporator 3 and the liquid level in the evaporator 3 descends to the height of the lower detecting probe 8, the valve 10 shuts and the metering pump 11 stops both automatically in response to the signal transmitted from the liquid level control means.

Thus, the liquid level in the evaporator is maintained at a height between the two detecting probes 7, 8 at all times, i.e., some amount of the liquid carrier always stays in the bottom of the evaporator. Therefore, the liquid carrier prevents the gaseous formaldehyde generated therein from penetrating into the discharge conduit 9.

With reference to FIG. 3A, a nozzle 24 is crooked and the tip of the nozzle 24 is directed upward so that the polymer dispersion flows out of the nozzle 24 in the state of overflow, i.e. flows over the brim of the nozzle end.

In the modification of the nozzle as shown in FIG. 3B, a tray 33 is provided at the position such that the tip of the introduction conduit or the nozzle 24 is submerged below the surface of the liquid in the tray 33. The polymer dispersion flows over the brim of the tray 33.

As illustrated above, the nozzle 24 is so designed that the polymer dispersion flows into the evaporator 3 in the state of overflow. Therefore, even in the case where the feed of polymer dispersion is intermittently interrupted, the open end of the nozzle 24 is sealed with the polymer dispersion. Hence, gaseous formaldehyde generated in the evaporator 3 does not penetrate at all into the nozzle. Thus, the serious problem that gaseous formaldehyde polymerizes inside the nozzle and the resulting polymer is deposited on the inner wall of the nozzle, causing clogging, has now been completely solved.

In another embodiment of the present invention as shown in FIG. 4, a liquid carrier receiving tank 42 and a flow meter 55 are provided on the line 9 from the evaporator 3 to the mixing tank 12, instead of the metering pump 11 referred to in FIG. 2. The liquid carrier collected on the bottom of the evaporator 3 is discharged therefrom and flows into the receiving tank 42 in the following manner. First, both valves 41 and 43 are shut and a valve 40 is opened, the latter being provided on a vacuum line 34. When the inner pressure of the receiving tank 42 reaches below that of the evaporator 3 due to vacuuming, the valve 10 is opened to make the liquid carrier 32 flow into the receiving tank 42.

Then, the liquid carrier recovered in the receiving tank 42 is fed to the mixing tank 12 in the following manner; the valve 40 is shut and the valves 41 and 43 are opened in response to a signal transmitted from the liquid level detecting probes 7 and 8 through lines 66 and 68, respectively, the valve 41 being provided on a line 39 connected to a pressure source, whereby the inner pressure of the reserving tank 42 is increased; the flow meter 55 measures the volume rate of flow and transmits the signal through line 65 to the metering pump 16; the metering pump 16 feeds the formaldehyde polymer in the form of finely divided particles from the feed tank 14 to the mixing tank 12, automatically in response to the signal from the flow meter 55.

In this embodiment, an orifice meter 36 is further provided on conduit 22 in order to measure the pressure differential between the upstream and downstream of the orifice. The inner pressure of feed tank 19 is controlled so that the pressure differential indicated by differential pressure gauge 35 may be maintained constant. Therefore, the feed of polymer dispersion 31 from the feed tank 19 to the evaporator 3 is maintained at a substantially constant rate. A volume rate of polymer dispersion flow Q is expressed by the formula:

$$Q = CA \sqrt{2g.\Delta p/\gamma}$$

wherein $\Delta P$ is a pressure differential between the upstream and downstream, $A$ is a cross-sectional area of the orifice, $\gamma$ is a weight per unit volume of polymer dispersion, $g$ is the constant of acceleration due to gravity and $C$ is a flow coefficient which is considered substantially constant in this case, although it varies depending upon the viscosity of polymer dispersion. If $\Delta P$ is constant, Q is constant. That is, if the pressure differential indicated by the differential pressure gauge 35 is controlled so as to become constant by operating the valves 37 and 38 in response to the pressure signal transmitted from the gauge 35 through lines 69 and 70, respectively, the feed rate of polymer dispersion is maintained constant.

In still another embodiment of the present invention as shown in FIG. 5, two pairs of formaldehyde polymer feed tanks 14, 14' and mixing tanks 12, 12' are parallely equipped. Each mixing tank is connected to the circulating conduit of the liquid carrier recovered and the discharge conduit of the polymer dispersion.

At the start of operation, one mixing tank 12 is filled with the polymer-liquid carrier dispersion and the other 12' is empty. An introduction valve 44 is shut and a discharge valve 21 is opened, while an introduction valve 44' is opened and a discharge valve 21' is shut. Thus, the polymer dispersion 31 flows out of the mixing tank 12 to the gas generation system and the liquid carrier 32 flows into the other mixing tank 12'. When the mixing tank 12 becomes empty, a predetermined amount of formaldehyde polymer is charged into the other mixing tank 12' in proportion to the amount of the liquid carrier recovered therein. Then, these valves are switched over; the polymer dispersion flows out of the mixing tank 12' and the liquid carrier flows into the tank 12.

In a modified embodiment, while the polymer dispersion 31 continuously flows out of one of the mixing tanks and the liquid carrier continuously flows into the other mixing tank, formaldehyde polymer can be also continuously fed to the other mixing tank by the metering pump 16 or 16'. The metering pump 16 or 16' are automatically operates in response to the signal transmitted from the flow meter 55 through lines 65 and 65', respectively.

This parallel arrangement provides the following advantages. First, formaldehyde polymer and a liquid carrier can be mixed in exactly prescribed proportions without the use of a complicated powder-supply means. Second, the operation of mixing may be repeated at relatively long intervals of time. For example, if each of the mixing tanks employed has the capacity of receiving an amount of polymer dispersion sufficient for half a day's consumption, the operation of charging the polymer dispersion thereinto is required only twice a day.

A preferred structure of the evaporator 3 used for the gas generation is illustrated with reference to FIG. 6.

The evaporator 3 has a coaxial double-cylindrical structure, i.e. an inner jacketed cylinder 54, having a spiral groove 44 on it periphery, is located within an outer jacketed cylinder 47. Suitable heat transfer mediums such as steam, PCB (polychlorobiphenyl), polyethylene glycol, Dowtherm and the like are separatedly circulated in the two jackets 53 and 47, for heating the evaporator at the temperature of gas generation, i.e. 100° to 300°C, preferably 200° to 300°C. Reference numerals 71 and 72 identify intake and discharge lines of the heat transfer medium, respectively.

The polymer dispersion flows over the brim of tray 46 into spiral groove 44. A trough 45 or the like may be employed for introducing the polymer dispersion from the upper part of the tray 46 to the upper end of the spiral groove 44. While the polymer dispersion flows down along the spiral groove 44, gaseous formaldehyde is sublimated from the polymer in the slurry. A pressure gauge 51 is provided on the tubular projection 50 for measuring the inner vapor pressure of the evaporator. Inert liquid such as polyethylene glycol is enclosed in pipe 52 to prevent the penetration of gaseous formaldehyde into the pressure gauge 51.

We claim:

1. In an apparatus for generating gaseous formaldehyde from a formaldehyde polymer comprising
   a. one or more mixing tanks for preparing a dispersion of the formaldehyde polymer in a liquid carrier,
   b. a feed tank for receiving the dispersion from the mixing tank and feeding the dispersion to the evaporator set forth below,
   c. an evaporator for heating the dispersion at the temperature of formaldehyde gas generation, and
   d. a cooler for cooling the liquid carrier discharged from the evaporator, the improvement which comprises:
   said four members (a), (b), (c) and (d) are connected in series in that order, said mixing tank (a) being connected to a means for feeding the formaldehyde polymer as finely divided particles to said mixing tank (a), and said evaporator (b) being provided at the upper part thereof with an inlet feed means comprising an overflow means for making the dispersion flow into the evaporator in the state of overflow, said evaporator further having a formaldehyde gas discharge conduit, liquid level control means having upper and lower liquid level detecting probes, both probes being disposed below said formaldehyde gas discharge conduit and a liquid carrier discharge means disposed below said lower probe, said liquid level control means maintaining the free surface of the liquid carrier collected at the bottom of the evaporator at a height between the detecting probes by discharging the liquid carrier from the bottom of the evaporator in response to a signal from the liquid level control means.

2. An apparatus according to claim 1 further characterized in that said overflow means comprises a nozzle fitted to an introduction conduit of the dispersion, the tip of said nozzle being directed upward.

3. An apparatus according to claim 1 further characterized in that said overflow means comprises a tray for receiving the dispersion which tray is positioned such that the tip of an a conduit for introducing the dispersion or a nozzle fitted thereto is submerged below the surface of the dispersion in said tray.

4. An apparatus according to claim 1 further characterized in that a conduit for feeding the liquid carrier from the cooler to the mixing tank is provided with a flow meter which transmits a signal which controls said means for feeding the formaldehyde polymers to the mixing tank.

5. An apparatus according to claim 1 further characterized in that two mixing tanks are arranged in parallel and each of said mixing tanks is provided with dispersion feed valve means, and an inlet recirculation liquid carrier valve means for changing alternately a flow of the dispersion fed from one of said mixing tanks and a flow of the liquid carrier circulated to the other.

6. An apparatus according to claim 1 further characterized in that a receiving tank is provided between the cooler and the mixing tank, for receiving the liquid carrier from the cooler and feeding same to the mixing tank.

7. An apparatus according to claim 1 further characterized in that there are provided, as liquid feed means, at least one metering pump means.

8. An apparatus according to claim 7 further characterized in that there is provided a pressure control means for changing the inner pressure of each of the tanks and the evaporator.

9. An apparatus for generating gaseous formaldehyde from a formaldehyde polymer, comprising:
   at least one mixing tank for preparing a dispersion of the formaldehyde polymer in a carrier liquid, a first conduit for discharging the dispersion from the mixing tank and a first control valve in said first conduit;
   a feed tank for receiving the dispersion from the first conduit, a first pair of upper and lower liquid level detecting probes in the feed tank, said probes being connected to control opening and closing of said first control valve to maintain the level of the dispersion in the feed tank between said first pair of probes, said feed tank having a second conduit for discharging the dispersion therefrom;
   an evaporator for receiving the dispersion from the second conduit, said evaporator having a feed nozzle at the upper end thereof and connected to said second conduit, said feed nozzle having an upwardly opening discharge opening so that the dispersion overflows from said discharge opening into said evaporator, said evaporator having means for heating the dispersion at the temperature of formaldehyde gas generation, said evaporator having a formaldehyde gas discharge conduit, a second pair of upper and lower liquid level detecting probes disposed below said formaldehyde gas discharge conduit and a carrier liquid discharge conduit disposed below said lower probe of said second pair of probes, said carrier liquid discharge conduit having a second control valve therein, said second pair of probes being connected to control opening and closing of said second control valve to continuously maintain the level of the carrier liquid in the evaporator between said second pair of probes;
   a cooler connected to the carrier liquid discharge conduit for cooling the carrier liquid discharged from the evaporator;
   and means connected to the cooler for feeding the cooled carrier liquid to said mixing tank.

10. An apparatus according to claim 9, in which said mixing tank and said feed tank having inert gas sources connected to the upper ends thereof to apply pressure to the contents of said tanks.

11. An apparatus according to claim 10, including a further tank for holding particles of formaldehyde polymer, an inert gas source connected to the upper end of said further tank to apply pressure to the contents thereof, and a conduit for feeding formaldehyde polymer particles from said further tank into said mixing tank.

* * * * *